United States Patent
Xiang

(10) Patent No.: US 9,750,281 B2
(45) Date of Patent: Sep. 5, 2017

(54) ELECTRONIC CIGARETTE CHARGING AND DISCHARGING CIRCUIT, BATTERY ASSEMBLY AND ELECTRONIC CIGARETTE

(71) Applicant: Zhiyong Xiang, Dongguan (CN)

(72) Inventor: Zhiyong Xiang, Dongguan (CN)

(73) Assignee: HUIZHOU KIMREE TECHNOLOGY CO., LTD. SHENZHEN BRANCH, Guangdong (CN)

( * ) Notice: Subject to any disclaimer, the term of this patent is extended or adjusted under 35 U.S.C. 154(b) by 0 days.

(21) Appl. No.: 14/119,100

(22) PCT Filed: Sep. 30, 2013

(86) PCT No.: PCT/CN2013/084676
§ 371 (c)(1),
(2) Date: Nov. 20, 2013

(87) PCT Pub. No.: WO2015/027547
PCT Pub. Date: Mar. 5, 2015

(65) Prior Publication Data
US 2016/0278433 A1   Sep. 29, 2016

(30) Foreign Application Priority Data

Aug. 30, 2013 (CN) .................... 2013 2 0539904 U

(51) Int. Cl.
*H02J 7/00* (2006.01)
*A24F 47/00* (2006.01)
(Continued)

(52) U.S. Cl.
CPC .......... *A24F 47/008* (2013.01); *H01M 2/1055* (2013.01); *H01M 2/204* (2013.01);
(Continued)

(58) Field of Classification Search
CPC ...... H01M 2/1055; H01M 2/204; H01M 2/34; H01M 10/05; H01M 2/20; H02J 7/0042; H02J 7/0045; A24F 47/008; H05B 3/06
(Continued)

(56) References Cited

U.S. PATENT DOCUMENTS

2011/0265806 A1*  11/2011  Alarcon ................. A24F 47/00
                                                                    131/273
2013/0336358 A1*  12/2013  Liu ...................... G01K 13/002
                                                                    374/152
(Continued)

FOREIGN PATENT DOCUMENTS

CN     101756352 A    6/2010
CN     202328361 U    7/2012
(Continued)

OTHER PUBLICATIONS

English Translation of CN101756352 performed on Dec. 27, 2016 from espacenet, 16 pages.*

*Primary Examiner* — Nathaniel Pelton
(74) *Attorney, Agent, or Firm* — Ohlandt, Greeley, Ruggiero & Perle, LLP

(57) ABSTRACT

The present application discloses an electronic cigarette charging and discharging circuit, wherein the electronic cigarette is provided with a charging input interface, such that the battery assembly can be directly inserted into a charger to be charged without removing the atomizing assembly, therefore the operation is more convenient, and wear and loose at the connecting portion caused by frequent disassembling and assembling can also be avoided. The present application further provides an electronic cigarette having the above charging structure and a battery assembly of the electronic cigarette. Besides being convenient for charging, the electronic cigarette may directly use a battery sleeve as an electrode, thus has a simple structure and is easy to manufacture.

9 Claims, 4 Drawing Sheets

(51) Int. Cl.
*H01M 2/10* (2006.01)
*H01M 2/20* (2006.01)
*H01M 2/34* (2006.01)
*H01M 10/05* (2010.01)
*H05B 3/06* (2006.01)

(52) U.S. Cl.
CPC ............. *H01M 2/34* (2013.01); *H01M 10/05* (2013.01); *H02J 7/0042* (2013.01); *H02J 7/0045* (2013.01); *H05B 3/06* (2013.01)

(58) Field of Classification Search
USPC ......................................................... 320/114
See application file for complete search history.

(56) References Cited

U.S. PATENT DOCUMENTS

| 2014/0083443 A1* | 3/2014 | Liu ...................... H02J 7/0044 |
| | | 131/329 |
| 2015/0002076 A1* | 1/2015 | Xiang .................... H02J 7/045 |
| | | 320/107 |
| 2015/0201676 A1* | 7/2015 | Shin ...................... A24F 47/008 |
| | | 131/329 |

FOREIGN PATENT DOCUMENTS

| CN | 102754924 A | 10/2012 |
| CN | 202328361   | * 11/2012 |
| CN | 102894486 A | 1/2013 |
| CN | 203434232 U | 2/2014 |

\* cited by examiner

US 9,750,281 B2

ELECTRONIC CIGARETTE CHARGING AND DISCHARGING CIRCUIT, BATTERY ASSEMBLY AND ELECTRONIC CIGARETTE

The application is the national phase of International Application No. PCT/CN2013/084676, titled "ELECTRONIC CIGARETTE CHARGING AND DISCHARGING CIRCUIT, BATTERY ASSEMBLY AND ELECTRONIC CIGARETTE", filed on Sep. 30, 2013, which claims the benefit of priority to Chinese patent application No. 201320539904.2, titled "ELECTRONIC CIGARETTE CHARGING AND DISCHARGING CIRCUIT, BATTERY ASSEMBLY AND ELECTRONIC CIGARETTE" and filed with the Chinese State Intellectual Property Office on Aug. 30, 2013, the entire disclosure of which is incorporated herein by reference.

BACKGROUND

1. Field of the Disclosure

The present application relates to the technical field of electronic cigarettes, and particularly to an electronic cigarette charging and discharging circuit, a battery assembly and an electronic cigarette.

2. Discussion of the Background Art

A conventional electronic cigarette mainly includes a battery assembly and an atomizing assembly, the structure of which is shown in FIG. 1. The battery assembly includes an end cap 11, an integrated microphone controller 12, a microphone seat 13, a battery 14, a battery sleeve 15, a spring electrode 16, an electrode fixing seat 17, and a connecting seat 18. The atomizing assembly includes a connector 20, an upper electrode 21, an upper insulating ring 22, an atomizing seat 23, an electric heating wire 24, a PVC fiberglass sleeving 25, a tar storage cotton 26, an atomizing sleeve 27, a sealing ring 28 and a mouthpiece cover 29.

As shown in FIG. 1, working electrodes of the electronic cigarette are located at a portion where the battery assembly and the atomizing assembly are connected, and also serve as charging electrodes, i.e., a charging input terminal and a discharging output terminal of the electronic cigarette are the same port 19 (FIG. 2). Hence, when charging the battery assembly, the atomizing assembly needs to be disassembled firstly, and then a power supply can be input from an interface connecting the atomizing assembly to charge the battery, and a schematic circuit diagram is shown in FIG. 2.

It is easy to know that, the electronic cigarette having such structure in the prior art is inconvenient to operate since the atomizing assembly is required to be detached from the battery assembly when charging the electronic cigarette, and is apt to cause wear and loose of the connecting portion over a long period of time, thus may bring a bad using experience for a user.

Therefore, in view of the above situation, a technical problem to be solved presently by those skilled in the art is to provide an improved charging and discharging structure for the electronic cigarette, such that the battery assembly may be charged without removing the atomizing assembly, thereby facilitating the operation.

SUMMARY

In view of this, the present application provides an electronic cigarette charging and discharging circuit, with which a battery assembly of an electronic cigarette can be directly charged without removing an atomizing assembly, therefore the operation is more convenient, and wear and loose at a connecting portion caused by frequently assembling and disassembling may be avoided.

The present application further provides an electronic cigarette having the charging and discharging circuit, and a battery assembly of the electronic cigarette.

In order to achieve the above objects, the present application provides the following technical solutions.

An electronic cigarette charging and discharging circuit includes an integrated microphone controller and further includes:

a charging input interface;

a charging management circuit having an input terminal connected to a first terminal of the charging input interface and an output terminal connected to a positive electrode or a negative electrode of a battery; and a charging and discharging two-in-one interface having a first terminal connected to an output terminal of the integrated microphone controller; and each of a second terminal of the charging input interface, a ground terminal of the integrated microphone controller and a second terminal of the charging and discharging two-in-one interface is connected to the negative electrode of the battery.

Preferably, the charging management circuit includes a charging integrated circuit, a first light emitting diode, a second light emitting diode, a capacitor, a first resistor, a second resistor and a third resistor;

an anode of the first light emitting diode and an anode of the second light emitting diode are both connected to a VCC terminal of the charging integrated circuit, and the shared connecting terminal functions as the input terminal of the charging management circuit;

a cathode of the first light emitting diode is connected to a CHRG terminal of the charging integrated circuit via the first resistor, a cathode of the second light emitting diode is connected to an LED terminal of the charging integrated circuit via the second resistor, a PROG terminal of the charging integrated circuit is connected to a first terminal of the third resistor, and each of a second terminal of the third resistor, a GND terminal of the charging integrated circuit and a first terminal of the capacitor is grounded; and the charging integrated circuit has a BAT terminal connected to a second terminal of the capacitor and functioning as the output terminal of the charging management circuit.

Preferably, the charging management circuit includes a diode, and the diode has an anode functioning as the input terminal of the charging management circuit and a cathode functioning as the output terminal of the charging management circuit.

A battery assembly of an electronic cigarette includes any one of the above described electronic cigarette charging and discharging circuits.

An electronic cigarette includes a battery assembly and an atomizing assembly, wherein a metallic outer sleeve of the battery assembly is electrically connected to a metallic outer sleeve of the atomizing assembly, and the battery assembly includes any one of the above-described electrical cigarette charging and discharging circuits.

An electronic cigarette includes a battery assembly and an atomizing assembly, the battery assembly includes a second integrated controller, and the second integrated controller includes a charging management circuit and an integrated microphone controller.

As can be seen from the above technical solutions, in the electronic cigarette charging and discharging circuit, the battery assembly and the electronic cigarette according to the present application, since the electronic cigarette is provided with the charging input interface, the battery assembly can be directly inserted into a charger to be charged without removing the atomizing assembly, therefore the operation is more convenient, and wear and loose at the connecting portion caused by frequent disassembling and assembling are avoided.

BRIEF DESCRIPTION OF THE DRAWINGS

For more clearly illustrating embodiments of the present application or the technical solution in the prior art, drawings referred to describe the embodiments or the prior art will be briefly described hereinafter. Apparently, the drawings in the following description are only several embodiments of the present application, and for the person skilled in the art other drawings may be obtained based on these drawings without any creative efforts.

REFERENCE NUMERALS IN FIGS. 1 TO 8

11 end cap,
12 microphone controller,
13 microphone seat,
14 battery,
15 battery sleeve,
16 spring electrode,
17 electrode fixing seat,
18 connecting seat,
20 connector,
21 upper electrode,
22 upper insulating ring,
23 atomizing seat,
24 electric heating wire,
25 PVC fiberglass sleeving,
26 tar storage cotton,
27 atomizing sleeve,
28 sealing ring,
29 mouthpiece cover;
31 charging input interface,
32 discharging output interface,
33 charging management circuit, and
34 second integrated microphone controller.

DETAILED DESCRIPTION OF THE PREFERRED EMBODIMENTS

The present application provides an electronic cigarette charging and discharging circuit, a battery assembly and an electronic cigarette, wherein the battery assembly of the electronic cigarette can be directly charged without removing an atomizing assembly, therefore the operation is more convenient, and wear and loose at a connecting portion caused by frequent disassembling and assembling is avoided.

The technical solutions in the embodiments of the present application will be described clearly and completely hereinafter in conjunction with the drawings in the embodiments of the present application. Apparently, the described embodiments are only a part of the embodiments of the present application, rather than all embodiments. Based on the embodiments in the present application, all of other embodiments, made by the person skilled in the art without any creative efforts, fall into the protection scope of the present application.

First Embodiment

Figure 1:
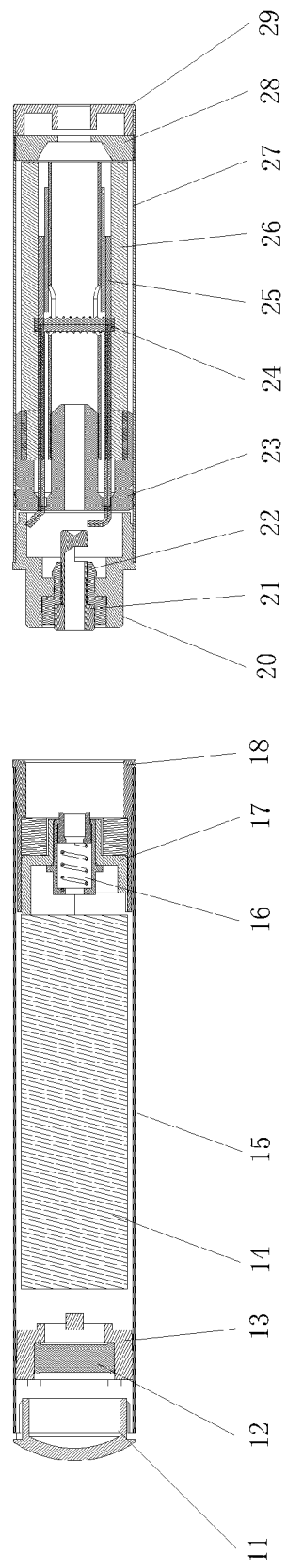
FIG. 1 is a schematic view showing the structure of an electronic cigarette in the prior art.
Figure 2:
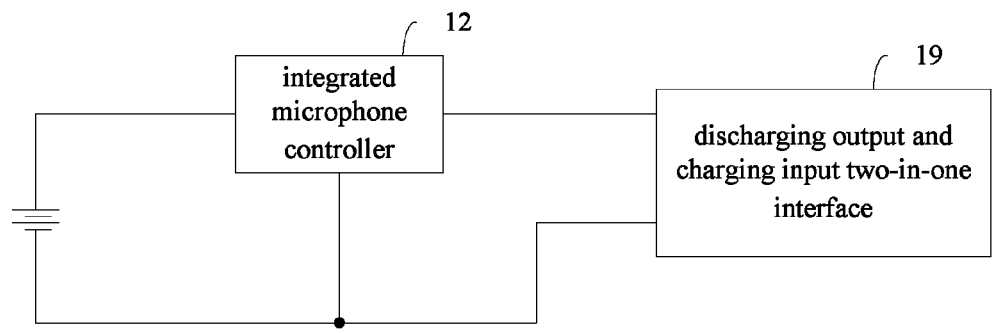
FIG. 2 is a schematic view showing the structure of a charging and discharging circuit of the electronic cigarette in the prior art.
Figure 3:
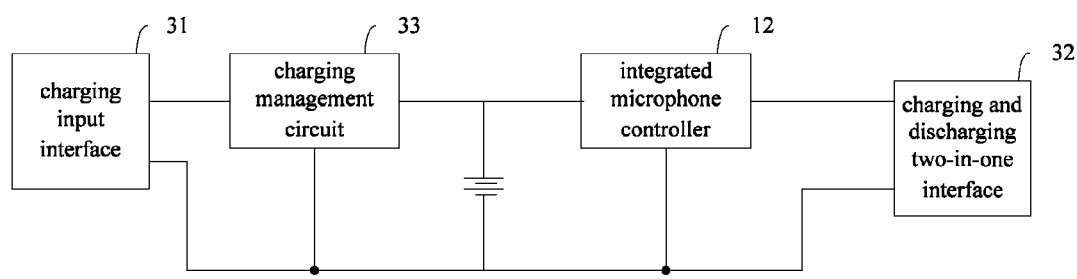
FIG. 3 is a schematic view showing the structure of a charging and discharging circuit of an electronic cigarette according to a first embodiment of the present application.

Referring to FIG. 3, a charging and discharging circuit of an electronic cigarette according to the present application includes an integrated microphone controller 12, which is an integrated microphone controller in the prior art and is not modified in this embodiment. In addition, the charging and discharging circuit further includes a charging input interface 31, a charging and discharging two-in-one interface 32 and a charging management circuit 33.

The charging management circuit 33 has an input terminal connected to a first terminal of the charging input interface 31, and an output terminal connected to a positive electrode or a negative electrode of a battery, the charging and discharging two-in-one interface 32 has a first terminal connected to an output terminal of the integrated microphone controller 12, and each of a second terminal of the charging input interface 31, a ground terminal of the integrated microphone controller 12 and a second terminal of the charging and discharging two-in-one interface 32 is connected to the negative electrode of the battery.

An operation process of the charging and discharging circuit according to this embodiment is briefly described as follows in conjunction with the above connection relationship of the circuit. After being connected to an external power supply, the charging input interface charges the battery in the battery assembly through the charging management circuit. It should be noted that, the charging management circuit according to this embodiment has the same circuit structure and function as a charger of a common electronic device (such as a mobile phone or a tablet computer), which will not be described herein. Further, the battery may supply power to the atomizing assembly of the electronic cigarette through the charging and discharging two-in-one interface.

As can be seen from the above connection relationship of components of the charging and discharging circuit of the electronic cigarette, the electronic cigarette in the first embodiment is provided with a charging input interface, such that the battery assembly can be directly charged by inserting a charger into the charging input interface without removing the atomizing assembly, therefore the operation is more convenient, and wear and loose at a connecting portion caused by frequent disassembling and assembling are avoided.

It should be noted that, the modified electronic cigarette according to this embodiment may also be charged in the charging method in the prior art, in addition to the above-mentioned charging method.

Furthermore, to further facilitate the charging operation, the charging input interface 31 is preferably arranged at a peripheral surface of the battery assembly of the electronic cigarette or at an end cap 11 of the battery assembly in this embodiment. Therefore, compared to a structure that the charging input interface 31 being arranged at the atomizing assembly, the above structure is simpler and needs less adjustment.

Figure 6:
FIG. 6 is a schematic view showing the structure of an electronic cigarette according to an embodiment of the present application.

For further optimizing the above technical solution, the charging input interface 31 may be arranged at the end cap 11 of the battery assembly as shown in FIG. 6, i.e., away from an end of the battery assembly for connecting the atomizing assembly, and the working electrode is located at this end. Due to such structure, the electronic cigarette may be charged by inserting the end, having the end cap, of the electronic cigarette directly into the charger. It should be appreciated that, the end cap is referred to as a lamp cap when an LED light for simulating tobacco burning is arranged inside the end cap.

It should be noted that, the charging input interface according to this solution may also be arranged at different positions on the battery assembly in addition to the end cap, or may be arranged on the atomizing assembly. The arranging position may be appropriately adjusted by those skilled in the art according to actual requirements, which will not be described herein.

Figure 5:
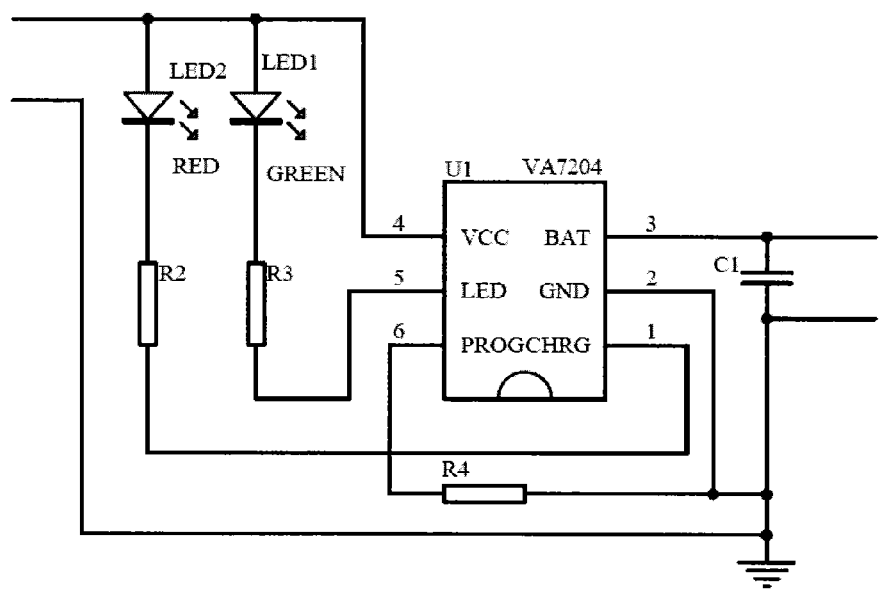
FIG. 5 is a specific circuit diagram of a charging management circuit according to the present application.

The first embodiment further provides a specific implementation of the charging management circuit. As shown in FIG. 5, the charging management circuit includes a charging integrated circuit (abbreviated as IC), a first light emitting diode LED2, a second light emitting diode LED1, a capacitor C1, a first resistor R2, a second resistor R3, and a third resistor R4.

An anode of the first light emitting diode LED2 and an anode of the second light emitting diode LED1 are both connected to a VCC terminal of the charging IC, and the shared connecting terminal functions as an input terminal of the charging management circuit 33.

A cathode of the first light emitting diode LED2 is connected to a CHRG terminal of the charging IC via the first resistor R2, a cathode of the second light emitting diode LED1 is connected to an LED terminal of the charging IC via the second resistor R3, the charging IC has a PROG terminal connected to a first terminal of the third resistor R4, and each of a second terminal of the third resistor, a GND terminal of the charging IC and a first terminal of the capacitor C1 is grounded.

The charging IC has a BAT terminal connected to a second terminal of the capacitor C1 and functioning as an output terminal of the charging management circuit 33.

In conjunction with the specific circuit connection relationship, the operating principle of the charging management circuit is that the battery of the electronic cigarette is charged by the charging IC after the charging input interface is connected to an external power supply. Specifically, an electrical signal is input into the VCC terminal of the charging IC, and then the BAT terminal of the charging IC outputs the electrical signal to a positive electrode of the battery of the electronic cigarette. At this time, the light emitting diode LED2 is turned on, i.e., a red light is turned on, indicating that "the battery is being charged". When the charging IC detects that the battery is fully charged, the light emitting diode LED1 is turned on and the light emitting diode LED2 is turned off, i.e., when the battery is fully charged, a green light is turned on and the red light is turned off.

It should be noted that, the charging management circuit according to this embodiment is not limited to the specific circuit described above, and a circuit in a charging device of a common electronic device may also be used. Further, the colors of the indicator lights are not limited herein, for example, the red light is turned on when the battery is being charged and is turned off when the battery is fully charged. There are many possible implementations of the charging circuits, which can not be described exhaustively in the present application, thus will not be described in detail herein.

Second Embodiment

Figure 4:
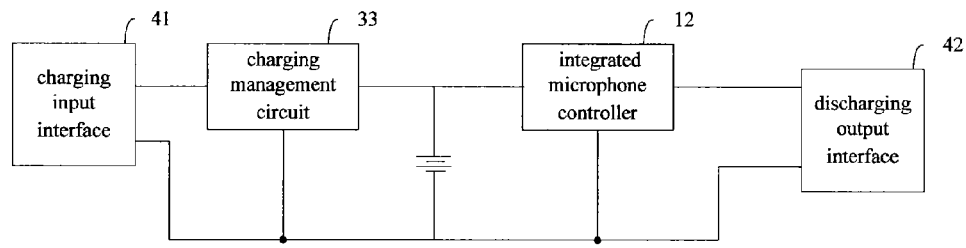
FIG. 4 is a schematic view showing the structure of a charging and discharging circuit of an electronic cigarette according to a second embodiment of the present application.

Referring to FIG. 4, another charging and discharging circuit of the electronic cigarette according to the present application includes an integrated microphone controller 12, which is an integrated microphone controller in the prior art and is not modified in this embodiment. In addition, the charging and discharging circuit further includes a charging input interface 41, a discharging output interface 42 and a charging management circuit 33.

Unlike the first embodiment, this embodiment employs the discharging output interface to replace the charging and discharging two-in-one interface. This embodiment has the same work principle and circuit connection manner as the first embodiment, which will not be described herein.

Furthermore, to further facilitate the charging operation, the charging input interface 31 is preferably arranged at a peripheral surface of the battery assembly of the electronic cigarette or at an end cap 11 of the battery assembly in this embodiment. Therefore, compared to a structure that the charging input interface 31 being arranged at the atomizing assembly, the above structure is simpler and needs less adjustment.

For further optimizing the above technical solution, the charging input interface 31 may be arranged at the end cap 11 of the battery assembly as shown in FIG. 6, i.e., away from an end of the battery assembly for connecting the atomizing assembly, and the working electrode is located at this end. Due to such structure, the electronic cigarette may be charged by inserting the end, having the end cap, of the electronic cigarette directly into the charger. It should be appreciated that, the end cap is referred to as a lamp cap when an LED light for simulating tobacco burning is arranged inside the end cap.

It should be noted that, the charging input interface according to this solution may also be arranged at different positions on the battery assembly in addition to the end cap, or may be arranged on the atomizing assembly. The arranging position may be appropriately adjusted by those skilled in the art according to actual requirements, which will not be described herein.

Third Embodiment

Figure 7:
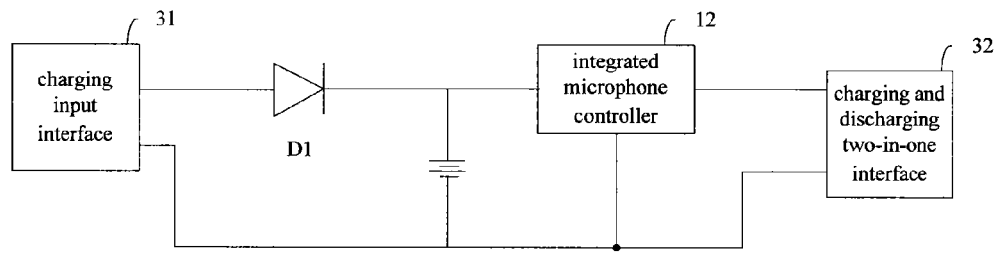
FIG. 7 is a schematic view showing the structure of a charging and discharging circuit of an electronic cigarette according to a third embodiment of the present application.

Reference is made to FIG. 7 which is a schematic view showing the structure of a second charging and discharging circuit of an electronic cigarette according to the present application. The charging and discharging circuit includes an integrated microphone controller 12, a charging input interface 31, a discharging output interface 32 (or a charging and discharging two-in-one interface), and a charging management circuit. Unlike the first embodiment, in the third embodiment, the charging management circuit includes a diode. The diode has an anode functioning as an input terminal of the charging management circuit, and a cathode functioning as an output terminal of the charging management circuit.

Preferably, the diode may be a Schottky diode, a rectifier diode, or a switching diode, so as to realize a unidirectional control for charging input.

The structure of the charging management circuit according to this embodiment is obviously different from the structure of the specific circuits of the charging management circuits in the first embodiment, because in this embodiment, the charging management circuit in the first embodiment is arranged between the charging input port and an external power supply, i.e. the charging management circuit is used as an adapter for the external power supply, for example, a laptop needs to be connected to an external power supply (for example a socket) via a power supply adapter.

Similarly, a charging input interface and a discharging output interface (or a charging and discharging two-in-one interface) are separated from each other in the third embodiment, such that the battery assembly can be directly charged by inserting a charger into the charging input interface without removing an atomizing assembly, therefore the operation is more convenient and wear and loose at the connecting portion caused by frequent disassembling and assembling are avoided.

Fourth Embodiment

The present application further provides a battery assembly of an electronic cigarette, including an electronic cigarette charging and discharging circuit. The charging and discharging circuit of the electronic cigarette may be the charging and discharging circuit in the first embodiment, and may also be the charging and discharging circuit in the second embodiment. The circuit connection relationship and the work principle of the charging and discharging circuit are similar to those of the first embodiment and the second embodiment, which will not be described herein.

In addition to the above embodiments, an embodiment of the present application further provides an electronic cigarette including a battery assembly and an atomizing assembly, wherein a metallic outer sleeve of the battery assembly is electrically connected to a metallic outer sleeve of the atomizing assembly directly, and the battery assembly includes the electronic cigarette charging and discharging circuit according to any one of the above embodiments.

By electrically connecting the metallic outer sleeves of the battery assembly and the atomizing assembly directly, the metallic outer sleeve may function as a negative electrode. In this case, by inputting a positive electrode into the charging input interface at the lamp cap, the electronic cigarette may be charged through the lamp cap without disassembling the atomizing assembly, therefore the operation is convenient.

Figure 8:
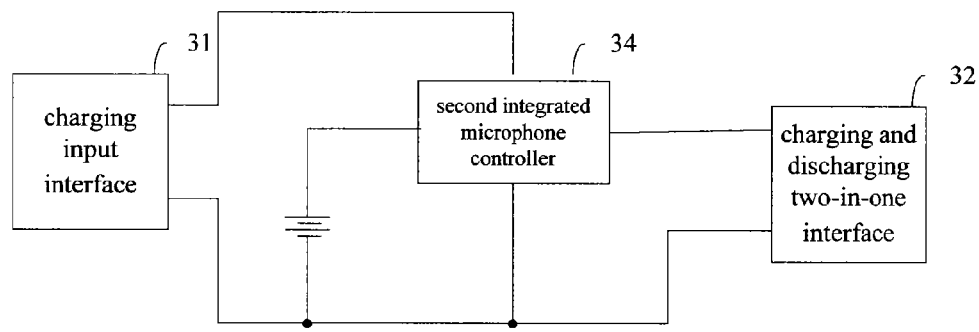
FIG. 8 is a schematic view showing the structure of a charging and discharging circuit of an electronic cigarette according to a fourth embodiment of the present application.

Based on the electronic cigarette charging and discharging circuit, the present application provides another electronic cigarette, as shown in FIG. 8. The electronic cigarette includes a battery assembly and an atomizing assembly, wherein the battery assembly includes a charging input interface, a discharging output interface and a second integrated microphone controller, and the second integrated microphone controller includes a charging management circuit and an integrated microphone controller.

The integrated microphone controller is an integrated microphone controller in the prior art, and has the same circuit structure as the prior art, which will not be described herein. The charging management circuit may include the charging management circuit in the first embodiment and the charging management circuit in the second embodiment.

The charging management circuit includes a charging integrated circuit (abbreviated as IC), a first light emitting diode LED2, a second light emitting diode LED1, a capacitor C1, a first resistor R2, a second resistor R3, and a third resistor R4.

An anode of the first light emitting diode LED2 and an anode of the second light emitting diode LED1 are both connected to a VCC terminal of the charging IC, and the shared connecting terminal functions as an input terminal of the charging management circuit 33.

A cathode of the first light emitting diode LED2 is connected to a CHRG terminal of the charging IC via the first resistor R2, a cathode of the second light emitting diode LED1 is connected to an LED terminal of the charging IC via the second resistor R3, the charging IC has a PROG terminal connected to a first terminal of the third resistor R4, and each of a second terminal of the third resistor, a GND terminal of the charging IC and a first terminal of the capacitor C1 is grounded.

The charging IC has a BAT terminal connected to a second terminal of the capacitor C1 and functioning as an output terminal of the charging management circuit 33.

In conjunction with the specific circuit connection relationship, the operating principle of the charging management circuit is that the battery of the electronic cigarette is charged by the charging IC after the charging input interface is connected to an external power supply. Specifically, an electrical signal is input into the VCC terminal of the charging IC, and then the BAT terminal of the charging IC outputs the electrical signal to a positive electrode of the battery of the electronic cigarette. At this time, the light emitting diode LED2 is turned on, i.e., a red light is turned on, indicating that "the battery is being charged". When the charging IC detects that the battery is fully charged, the light emitting diode LED1 is turned on and the light emitting diode LED2 is turned off, i.e., when the battery is fully charged, a green light is turned on and the red light is turned off.

Or, the charging management circuit includes a diode. The diode has an anode functioning as an input terminal of the charging management circuit, and a cathode functioning as an output terminal of the charging management circuit.

In conclusion, in the electronic cigarette charging and discharging circuit according to the embodiments of the present application, the charging input interface is separated from the discharging output interface (or the discharging output interface), such that the battery assembly can be directly inserted into a charger to be charged without removing the atomizing assembly, therefore the operation is more convenient, and wear and loose at the connecting portion caused by frequent disassembling and assembling can also be avoided. The present application further provides an electronic cigarette having the above charging structure and a battery assembly of the electronic cigarette. Besides being convenient for charging, the electronic cigarette may directly use a battery sleeve as an electrode, thus has a simple structure and is easy to manufacture.

The above embodiments are described in a progressive manner. Each of the embodiments is mainly focused on describing its differences from other embodiments, and references may be made among these embodiments with respect to the same or similar portions among these embodiments.

Based on the above description of the disclosed embodiments, the person skilled in the art is capable of carrying out or using the present application. It is obvious for the person skilled in the art to make many modifications to these embodiments. The general principle defined herein may be applied to other embodiments without departing from the spirit or scope of the present application. Therefore, the present application is not limited to the embodiments illustrated herein, but should be defined by the broadest scope consistent with the principle and novel features disclosed herein.

The invention claimed is:

1. An electronic cigarette charging and discharging circuit, comprising an integrated microphone controller, wherein the electronic cigarette charging and discharging circuit further comprises:
    a charging input interface;
    a charging management circuit having an input terminal connected to a first terminal of the charging input interface and an output terminal connected to a positive electrode or a negative electrode of a battery; and
    a charging and discharging two-in-one interface having a first terminal connected to an output terminal of the integrated microphone controller; and
    each of a second terminal of the charging input interface, a ground terminal of the integrated microphone controller and a second terminal of the charging and discharging two-in-one interface is connected to the negative electrode of the battery;
    wherein the charging management circuit comprises a charging integrated circuit, a first light emitting diode, a second light emitting diode, a capacitor, a first resistor, a second resistor and a third resistor;
    an anode of the first light emitting diode and an anode of the second light emitting diode are both connected to a VCC terminal of the charging integrated circuit, and the shared connecting terminal functions as the input terminal of the charging management circuit;
    a cathode of the first light emitting diode is connected to a CHRG terminal of the charging integrated circuit via the first resistor, a cathode of the second light emitting diode is connected to an LED terminal of the charging integrated circuit via the second resistor, a PROG terminal of the charging integrated circuit is connected to a first terminal of the third resistor, and each of a second terminal of the third resistor, a GND terminal of the charging integrated circuit and a first terminal of the capacitor is grounded; and
    the charging integrated circuit has a BAT terminal connected to a second terminal of the capacitor and functioning as the output terminal of the charging management circuit.

2. The electronic cigarette charging and discharging circuit according to claim 1, wherein the charging management circuit comprises a diode, and the diode has an anode functioning as the input terminal of the charging management circuit and a cathode functioning as the output terminal of the charging management circuit.

3. The electronic cigarette charging and discharging circuit according to claim 1, wherein the charging input interface is arranged at a lamp cap of an electronic cigarette.

4. An electronic cigarette, comprising a battery assembly and an atomizing assembly, wherein a metallic outer sleeve of the battery assembly is electrically connected to a metallic outer sleeve of the atomizing assembly, and the battery assembly comprises the electronic cigarette charging and discharging circuit according to claim 1.

5. The electronic cigarette according to claim 4, wherein the charging management circuit comprises a diode, and the diode has an anode functioning as the input terminal of the charging management circuit and a cathode functioning as the output terminal of the charging management circuit.

6. The electronic cigarette according to claim 4, wherein the charging input interface is arranged at a lamp cap of an electronic cigarette.

7. A battery assembly of an electronic cigarette, comprising an electronic cigarette charging and discharging circuit having an integrated microphone controller, wherein the electronic cigarette charging and discharging circuit further comprises:
    a charging input interface;
    a charging management circuit having an input terminal connected to a first terminal of the charging input interface and an output terminal connected to a positive electrode or a negative electrode of a battery; and
    a charging and discharging two-in-one interface having a first terminal connected to an output terminal of the integrated microphone controller; and
    each of a second terminal of the charging input interface, a ground terminal of the integrated microphone controller and a second terminal of the charging and discharging two-in-one interface is connected to the negative electrode of the battery;
    wherein the charging management circuit comprises a charging integrated circuit, a first light emitting diode, a second light emitting diode, a capacitor, a first resistor, a second resistor and a third resistor;
    an anode of the first light emitting diode and an anode of the second light emitting diode are both connected to a VCC terminal of the charging integrated circuit, and the shared connecting terminal functions as the input terminal of the charging management circuit;
    a cathode of the first light emitting diode is connected to a CHRG terminal of the charging integrated circuit via the first resistor, a cathode of the second light emitting diode is connected to an LED terminal of the charging integrated circuit via the second resistor, a PROG terminal of the charging integrated circuit is connected to a first terminal of the third resistor, and each of a second terminal of the third resistor, a GND terminal of the charging integrated circuit and a first terminal of the capacitor is grounded; and
    the charging integrated circuit has a BAT terminal connected to a second terminal of the capacitor and functioning as the output terminal of the charging management circuit.

8. The battery assembly of an electronic cigarette according to claim 7, wherein the charging management circuit comprises a diode, and the diode has an anode functioning as the input terminal of the charging management circuit and a cathode functioning as the output terminal of the charging management circuit.

9. The battery assembly of an electronic cigarette according to claim 7, wherein the charging input interface is arranged at a lamp cap of an electronic cigarette.

* * * * *